US012762276B2

(12) United States Patent
Ferev et al.

(10) Patent No.: US 12,762,276 B2
(45) Date of Patent: Oct. 13, 2026

(54) DATA DEPERSONALIZATION USING ON-DEVICE GENERATIVE MODELS

(71) Applicant: GOOGLE LLC, Mountain View, CA (US)

(72) Inventors: Milen Ferev, New York, NY (US); Luke Boyer, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/926,061

(22) Filed: Oct. 24, 2024

(65) Prior Publication Data

US 2026/0119700 A1 Apr. 30, 2026

(51) Int. Cl.
*G06F 21/00* (2013.01)
*G06F 21/62* (2013.01)

(52) U.S. Cl.
CPC ................................ *G06F 21/6245* (2013.01)

(58) Field of Classification Search
CPC ................................................... G06F 21/6245
See application file for complete search history.

(56) References Cited

U.S. PATENT DOCUMENTS 11,675,817 B1 * 6/2023 Pratik .................... G06N 3/047 707/740
2021/0064921 A1 * 3/2021 Carbune .................. G06N 3/08
2023/0064482 A1 3/2023 Vikramaratne
2024/0144251 A1 5/2024 Magnuski et al.
2025/0371325 A1 * 12/2025 Crabtree ............... G06F 16/483
2026/0010273 A1 * 1/2026 Sedouram ........... G06F 3/04815
2026/0057564 A1 * 2/2026 Sadr ........................ G06T 11/00
(Continued)

FOREIGN PATENT DOCUMENTS

CN 117725610 3/2024
CN 118133335 A * 6/2024 ........... G06F 18/214
(Continued)

OTHER PUBLICATIONS

Hu et al., "LoRA: Low-Rank Adaptation of Large Language Models" arXiv:2106.09685v2 [cs.CL], 26 pages, dated Oct. 16, 2021.
(Continued)

*Primary Examiner* — Ghodrat Jamshidi
(74) *Attorney, Agent, or Firm* — Gray Ice Higdon

(57) ABSTRACT

Implementations relate to depersonalizing and/or anonymizing generative model inputs and/or outputs to remove sensitive and/or private information, such as PII (personally identifiable information). In various implementations, a generative model input prompt may be retrieved from local memory of the edge computing device and further processed using one or more generative models to generate generative model output. The generative model input prompt may be submitted to an edge-based anonymization process including assembling, as an anonymization prompt and processing the anonymization prompt using one or more on-device generative models of the edge computing device to generate an anonymized version of the portion of the generative model input prompt that is stripped of PII. The anonymized version may further be inspected of any remaining PII and the fully anonymized version may be surfaced without concern of leaking PII.

17 Claims, 7 Drawing Sheets

(56) References Cited

U.S. PATENT DOCUMENTS

| | | | | |
|---|---|---|---|---|
| 2026/0065517 | A1* | 3/2026 | Acuna Marrero | G06T 11/00 |
| 2026/0067196 | A1* | 3/2026 | Nerallapally | H04L 43/12 |
| 2026/0079258 | A1* | 3/2026 | Chen | G01S 17/931 |
| 2026/0087401 | A1* | 3/2026 | Naujoks | G06N 20/00 |
| 2026/0099985 | A1* | 4/2026 | Ren | G06T 15/08 |

FOREIGN PATENT DOCUMENTS

| | | | | | |
|---|---|---|---|---|---|
| CN | 120937376 | | * | 11/2025 | G10L 25/63 |
| EP | 3451209 | | | 3/2019 | |
| EP | 4446923 | | | 10/2024 | |
| IL | 316359 | A | * | 2/2025 | G06F 3/0481 |
| JP | 2024521053 | | | 5/2024 | |

OTHER PUBLICATIONS

Yermilov et al., "Privacy- and Utility-Preserving NLP with Anonymized Data: A case study of Pseudonymization" Proceedings of the 3rd Workshop on Trustworthy Natural Language Processing. 10 pages, dated Jul. 14, 2023.

"How to use LLMs to detect and extract personal data from AI datasets" Labelbox, Inc. 7 pages, dated Aug. 2, 2023.

Sha et al., "Prompt Stealing Attacks Against Large Language Models" arXiv:2402.12959v1 [cs.CR] 40 pages, dated Feb. 20, 2024.

"AnonLLM: Anonymize Personally Identifiable Information (PII) for Large Language Model APIs" Retrieved from https://github.com/fsndzomga/anonLLM. 4 pages.

"PII Masking" Retrieved from https://docs.llamaindex.ai/en/latest/examples/node_postprocessor/PII/#option-2-use-llm-for-pii-masking. 5 pages.

Anjan Biswas "Balancing Innovation With Safety & Privacy in the Era of Large Language Models (LLM)" Medium. 20 pages, dated Sep. 20, 2023.

European Patent Office, Communication issued in Application No. 25203213.1, 10 pages, dated Jan. 14, 2026.

Chen, Y. et al.; "Hide and Seek (HaS): A 1-15 Lightweight Framework for Prompt Privacy Protection", 7 pages, dated Sep. 6, 2023.

* cited by examiner

DATA DEPERSONALIZATION USING ON-DEVICE GENERATIVE MODELS

BACKGROUND

Generative machine learning models such as single-modal or multimodal large language models (LLMs) may be trained and/or fine-tuned using various types of data. One particularly useful type of training data is logs of user queries that are processed, e.g., using automated assistants (a.k.a. "virtual assistants," "chatbots," etc.) that may or may not be powered by generative models, and output that is responsive to those queries. However, user queries and/or responses to those queries may contain sensitive and/or private information, including but not limited to personally identifiable information (PII). Additionally, other metadata (e.g., contextual data, personal preferences, stored credit cards information, etc.) may be assembled into an input prompt along with user query, automatically or in response to an explicit user request. This other metadata may also contain PII. Training a generative model such as an LLM using PII-laden data raises the risk that the PII may be inadvertently exposed in subsequent generative model output. In addition, these logs of user queries and responses may be useful for other purposes. For example, they could potentially be used for analytics about how users engage with automated assistants. However, the privacy concerns remain.

SUMMARY

Implementations are described herein for depersonalizing and/or anonymizing various types of data to remove sensitive and/or private information, such as PII. More particularly, but not exclusively, implementations are described herein for using on-device generative model(s) to process PII-laden data, such as data contained in generative model inputs and/or outputs, user queries, metadata added to input prompts, back-and-forth dialogs between humans and other humans and/or automated assistants, etc., to generate anonymized data.

DETAILED DESCRIPTION OF THE DRAWINGS

Figure 1:
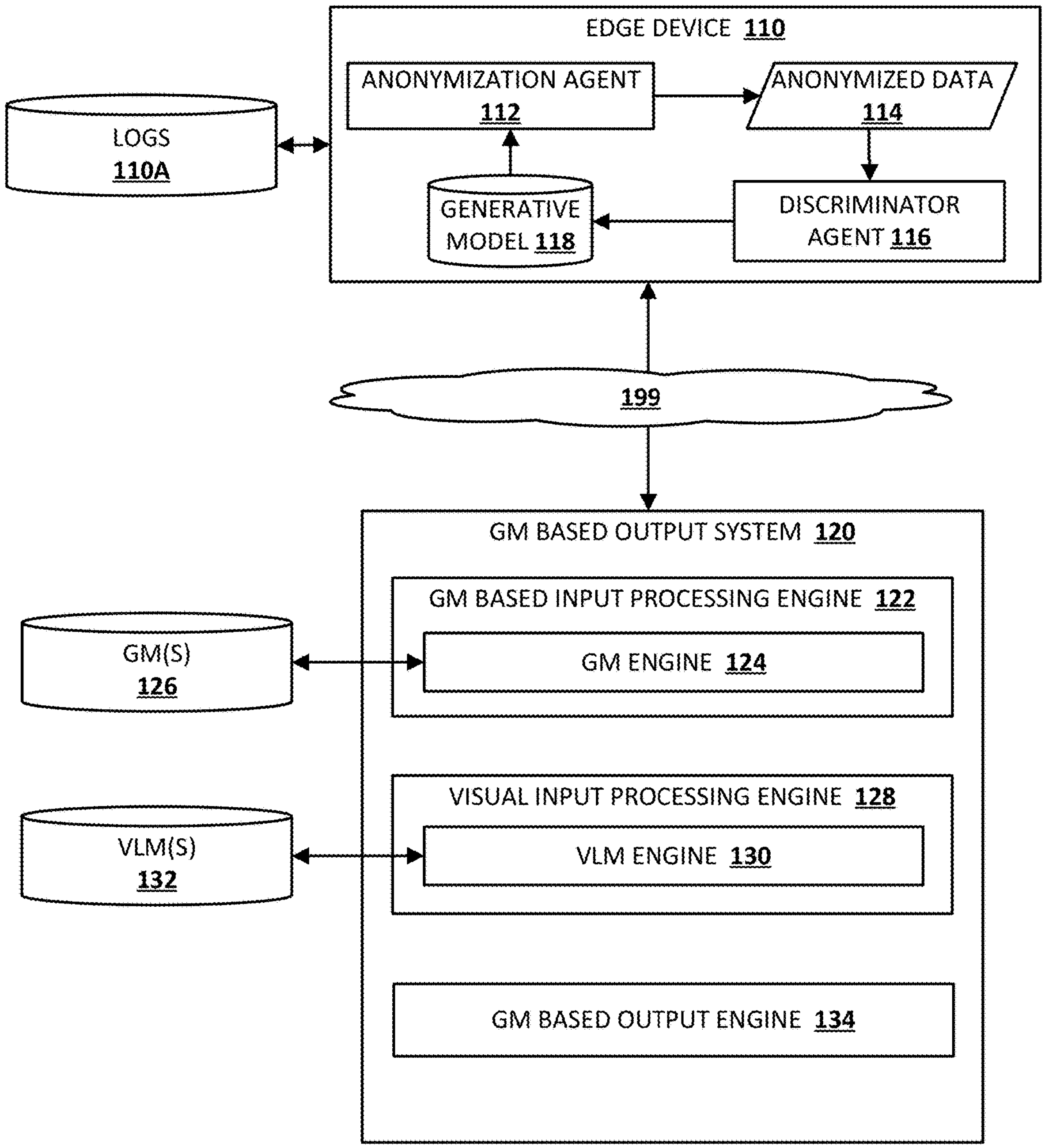
FIG. 1 depicts a block diagram of an example environment that demonstrates various aspects of the present disclosure, and in which some implementations disclosed herein can be implemented.

Implementations are described herein for depersonalizing and/or anonymizing various types of data to remove sensitive and/or private information, such as PII. More particularly, but not exclusively, implementations are described herein for using on-device generative model(s) to process PII-laden data, such as data contained in generative model inputs and/or outputs, user queries, metadata added to input prompts, back-and-forth dialogs between humans and other humans and/or automated assistants, etc., to generate anonymized data.

In some implementations, this process may be repeated/iterated until no PII is found. At that point, the anonymized version(s) of the original data may be made available to (e.g., "surfaced to") another computer system located at the edge and/or remote from the edge. That other computer system may then take various actions using the anonymized version(s) of the original data. For example, the other computer system may train and/or fine-tune one or more cloud-based and/or edge-based generative models. Training generative model(s) using anonymized, PII-free data, rather than the original data that contained PII, may prevent the PII from being "baked into" the generative model(s). Consequently, the generative model(s) cannot be exploited to gain access to PII.

The PII-stripped data described herein is by no means limited to use for training generative models. Numerous other purposes and applications are contemplated herein. As one non-limiting example, the PII-free data may be used for purposes such as analytics, interface design, etc. Also, stripping data of PII as described herein may reduce costs associated with storing sensitive data, such as compliance costs associated with regulations such as the Health Insurance Portability and Accountability Act (HIPAA), etc. As another example, different applications and/or machine learning models within the same edge computing device (e.g., mobile phone) may have different privacy requirements. One relatively secure application sharing PII-laden data directly or indirectly with another, less secure application may raise similar security and/or privacy concerns as sharing the PII-laden data directly with a remote computing device such as a server. For example, privacy leakage may occur transitively if sensitive information from one application is used to train an on-device generative model that is used to generate data for another application on the same edge device.

In various implementations, at least a portion of a generative model input prompt may be assembled into an "anonymization prompt", e.g., along with a command to anonymize the portion of the generative model input prompt. This anonymization prompt may include an explicit natural language query issued by the user, as well as other data that is explicitly incorporated by the user and/or included automatically (e.g., based on the user query, the context, etc.) with the user's permission. For example, with the user's permission (e.g., after the user explicitly opts in), various metadata indicative of attributes, preferences, and/or context of a user and/or an edge device operated by the user may be incorporated into the anonymization prompt automatically. This metadata may include, for instance, position coordinates of the user, a time of day, various sensor data generated by sensor(s) of the edge device, data from the user's electronic calendar or schedule, information from the user's electronic correspondence (e.g., emails, text messages, social media posts or direct messages, etc.), user preferences, configuration data related to Internet of Things (IoT) devices and appliances under the user's control, payment information, personal information, and so forth. Some of these data points may be PII, such as names, telephone number(s), address(es) for electronic correspondence, user credentials (e.g., for third party services such as IoT control, online shopping, online reservations, etc.), and so forth.

Various commands to anonymize data may be incorporated into the anonymization prompt as well. These commands may condition the generative model to process the data contained in the anonymization prompt in various ways. These commands may take various forms, such as predefined natural language commands, predefined flags, predefined signals, etc. In some implementations, the command to anonymize data may be a command to replace PII in the data with synthetic PII. For example, a real user's name and address may be replaced with a synthetized name (e.g., "John Doe") and a synthesized address, neither of which may exist in the real world. In other implementations, the command to anonymize data may be a command to replace instances of PII in the generative model input prompt with placeholders. In various implementations, these placeholders may be uniform or may identify a class of an entity (e.g., "<PERSON>", "<PLACE>", "<THING>") that was replaced. In yet other implementations, the command to anonymize data may be a command to generate a summary of the PII-laden data that omits PII. For instance, if Delia requests that a doctor's appointment be scheduled with Dr. Mavis at 1 PM on January 8, the resulting summary may be, for instance, "The user requested a doctor's appointment one afternoon in January." In addition to or instead of incorporating such commands, in some implementations, the on-device generative model may be fine tuned to remove particular types of PII (e.g., addresses, phone numbers, etc.), in which case one or or of the commands may be omitted.

In some implementations, data other than the generative model input prompt (and the command(s)) may be assembled into the anonymization prompt. For example, when the generative model input prompt was processed using one or more on-device generative models, the result may have been generative model output that was rendered for the requesting user (e.g., audibly, visually, etc.), and that also contained PII. Accordingly, in some implementations, the anonymization prompt may be assembled to include at least a portion of the generative model output. In many implementations, the generative model input prompt and corresponding generative model output generated from the generative model input prompt may be stored in a log associated with a virtual assistant, e.g., as a pair characterized as a user query and assistant response.

In various implementations, the anonymization prompt may be processed using one or more on-device generative models to generate/predict anonymized version(s) of whatever data was assembled into the anonymization prompt. The anonymized version(s) may be generated/predicted in a manner that is commensurate with the anonymization command that was included in the anonymization prompt. For example, if the command was to replace PII with synthetic PII, then PII such as a user's name, or another entity's name contained in the user query, may be replaced with a synthetic name that is generated by the generative model.

In various implementations, the anonymized version(s) may be inspected to determine whether any remaining PII or other sensitive information remains. In some implementations, this inspection may be performed using a discriminator machine learning model. In some such implementations, the discriminator machine learning model may be another on-device generative model, separate from the generative model that is used to anonymize the data, that is fine tuned to detect PII. In some such implementations, the discriminator machine learning model may be trained in tandem with a separate generative model trained as a "generator", similar to how generative adversarial networks are trained, in which the generator is trained to strip data of PII, and the discriminator is trained to detect whether data includes PII. In other implementations, the discriminator may be the same generative model as is used to process the anonymization prompt to generate the anonymized version(s). When the same generative model is used to both anonymize and detect PII, in some implementations, one or more low-rank adaptors (LoRA) may be coupled with the generative model and trained (e.g., while the generative model is held constant) independently, so that the combination of the generative model and LoRA may subsequently be used to detect PII.

Based on the result of this inspection revealing no remaining PII, the anonymized version(s) may be provided or made available to some downstream process or entity, such as the user or a remote server, that uses them for purposes such as training or fine-tuning generative model(s). If the inspection reveals some remaining PII, on the other hand, then the anonymized version(s) may be iteratively submitted to the same process (referred to herein as an "anonymization process") as many times as necessary until no PII remains, or until some stop condition is met.

In various implementations, the anonymization process described above may be performed entirely at the edge, e.g., on one or more devices forming part of a coordinated ecosystem of devices associated with a particular user. For example, the generative model(s) used to process the anonymization prompt to generate the anonymized version(s), and/or the generative model(s) used as the discriminator, may be "on-device" or "edge-based" models that are stored locally in memory of one or more edge-based, resource-constrained computing devices. As used herein, "resource-constrained" may refer to a computing device having significantly less memory and/or processing power than, say, a server implementing all or part of a cloud infrastructure, such as a mobile phone, tablet, or laptop operated by a user. However, in other implementations, the edge-based anonymization process could be performed at one or more central servers, assuming the original PII-laden data that is used to generate the anonymized data is not retained by those servers and/or made available outside of those servers.

Techniques described herein are not limited to textual data. In various implementations, other modalities of data, such as images, videos, digital audio, multimedia files, etc., may be processed as described herein to generate anonymized content that is safe to use for purposes such as training generative models. In some cases, generative model input prompts may include non-textual data such as image(s), audio sample(s), etc. As an example, a user could provide a digital image of a highly sensitive document, such as a tax return, and a query such as "what does my tax liability look to be?" When assembled into a generative model input prompt and processed using a multimodal generative model such as a vision language model (VLM), the resulting output may be something like "you owe $23,890 in taxes." Training a generative model using this generative model input-output pair would create a substantial risk that the user's highly sensitive information/PII could be exposed by the generative model subsequently.

Accordingly, in various implementations, a multimodal generative model may be used to anonymize one or both of the generative model input prompt and the resulting output. For example, an on-device VLM and/or diffusion model may be used to process the image of the tax return and replace PII with synthetic data, placeholders or even obfuscation annotation (e.g., blurring faces, in-painting, filters, redaction, etc.). Additionally or alternatively, the VLM may be used to query the image for textual content, and then this textual content may be assembled into an anonymization prompt and processed as described above to generate an anonymized version of the textual content that is safe to use for training data, without exposing the user's PII to the generative model that is being trained or fine-tuned. In some implementations where audio data is anonymized using techniques described herein, audio-specific features could be replaced with synthetic data and/or placeholders. For example word(s) that form PII could be bleeped.

FIG. 1 is a block diagram of an example environment that demonstrates various aspects of the present disclosure, and in which implementations disclosed herein can be implemented as depicted. The example environment includes an edge device 110 and a generative model (GM) based output system 120, which is depicted separately in FIG. 1. In some implementations, all or some aspects of the GM based output system 120 can be implemented locally at the edge device 110. In additional or alternative implementations, all or aspects of the GM based output system 120 can be implemented remotely from the edge device 110 as depicted in FIG. 1 (e.g., at remote server(s)). In those implementations, the edge device 110 and the GM based output system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The edge device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided. In some implementations, the edge device 110 may be resource constrained relative to GM based output system 120 (e.g., less computational resources), although this is not required in all cases.

The edge device 110 may be configured to perform an "edge-based anonymization process" to remove PII and/or other sensitive data from generative model inputs/outputs. To this end, the edge device 110 may include an anonymization agent 112 that is configured to depersonalize and/or anonymize inputs processed by, and/or outputs generated by, generative model 118 to remove sensitive and/or private information, such as PII. These inputs and/or outputs may be stored locally, e.g., in log(s) 110A. The anonymization agent 112 may strip PII from data in various ways. In some implementations, the anonymization agent 112 may leverage machine learning. For example, the anonymization agent 112 may assemble "anonymization prompts" from data contained in generative model inputs and/or outputs, such as user queries, metadata added to input prompts, etc. These anonymization prompts may be processed, e.g., by the anonymization agent 112 using one or more on-device generative models 118, such as an edge-based generative model stored in a smart phone's local memory, to generate anonymized data 114. Additionally or alternatively, in some implementations, the anonymization agent 112 may use non-machine learning techniques to strip data of PII, such as rules-based techniques, pattern matching (e.g., using regular expressions or other pattern templates to match credit cards), etc.

In various implementations, the edge device 110 may include a discriminator agent 116 to determine whether the edge-based anonymization process was successful. In various implementations, the discriminator agent 116 may receive the anonymized data 114 from the anonymization agent 112. The discriminator agent 116 may then inspect the anonymized data 114 to determine whether any remaining PII or other sensitive information remains. In some implementations, this inspection may be performed using a discriminator machine learning model, which in some cases may include one or more of the generative models 118. In some implementations, the discriminator generative model may be a separate on-device generative model that is trained and/or fine-tuned to detect PII. Additionally or alternatively, and like the anonymization agent 112, in some implementations, the discriminator agent 116 may use non-machine learning techniques to detect PII, such as rules-based techniques, pattern matching (e.g., credit cards can be detected using a particular numeric pattern), etc.

In some implementations, the discriminator generative model used by the discriminator agent 116 may be trained and/or fine tuned in tandem with the same generator machine learning model described previously, e.g., in a generative adversarial fashion in which the generator machine learning model is trained to strip (e.g., remove, replace with synthetic data or placeholders, etc.) data of PII, and the discriminator machine learning model is trained to detect whether data includes PII. In other implementations, the discriminator agent 116 may use the same generative model as was used by the anonymization agent 112 to process the anonymization prompt to generate the anonymized data 114. In some such implementations, one or more low-rank adaptor (LoRA) may be coupled with the larger trained generative model and trained (e.g., while the generative model is held constant) independently, so that the combination of the generative model and LoRA may subsequently be used as a discriminator that can detect PII.

In some implementations, this process may be repeated/iterated until no PII is found. At that point, the anonymized version(s) 114 of the original data may be made available to another computer system located at the edge and/or remote from the edge, such as GM based output system 120. That other computer system may then take various actions using the anonymized version(s) of the original data. For example, GM based output system 120 may train and/or fine-tune one or more generative models contained in a GM(s) database 126 and/or one or more VLMs contained in a VLM(s) database 132. While GM(s) and VLM(s) are shown in FIG. 1, this is not meant to be limiting; other types of generative models, such as generative models trained to process audio (e.g., tokens generated from digital audio samples/waveforms) to predict various information (e.g., speech-to-text, or "STT"). Additionally or alternatively, in some implementations, the on-device generative model 118 may be trained using this data. Training generative model(s) using anonymized, PII-free data, rather than the original data that contained PII, may prevent the generative model from surfacing PII outside of the user device. Consequently, the generative model(s) cannot be exploited to gain access to PII.

The edge device 110 and GM based output system 120 can include one or more memories for storage of data and/or software applications, one or more processors for accessing data and executing the software applications, and/or other components that facilitate communication over one or more of the networks 199. Each of the processor(s) may take various forms, such as a central processing unit (CPU), graphical processing unit (GPU), tensor processing unit (TPU), neural processing unit (NPU), etc. As used herein, unless indicated otherwise, the term “processor” may refer to any of a CPU, GPU, TPU, NPU, or any other type of processor not explicitly mentioned herein.

In some implementations, one or more of the software applications can be installed locally at the edge device 110, whereas in other implementations one or more of the software applications can be hosted remotely (e.g., by one or more servers) and can be accessible by the edge device 110 over one or more of the networks 199.

Although aspects of FIG. 1 are illustrated or described with respect to a single edge device, e.g., having a single user, it should be understood that is for the sake of example and is not meant to be limiting. For example, one or more additional edge devices of a user and/or of additional user(s) can also implement the techniques described herein. For instance, the edge device 110, the one or more additional edge devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The GM based output system 120 is illustrated in FIG. 1 as including a GM based input processing engine 122, a visual input processing engine 128, and a GM based output engine 134. Some of these engines can be combined and/or omitted in various implementations. Further, these engines can include various sub-engines. For instance, the GM based input processing engine 122 is illustrated in FIG. 1 as including a GM engine 124. Moreover, the visual input processing engine 128 is illustrated in FIG. 1 as including a VLM engine 130. Similarly, some of these sub-engines can be combined and/or omitted in various implementations. Accordingly, it should be understood that the various engines and sub-engines of the GM based output system 120 illustrated in FIG. 1 are depicted for the sake of describing certain functionalities and are not meant to be limiting.

The GM based output system 120 is illustrated in FIG. 1 as interfacing with various databases, such as GM(s) database 126 and VLM(s) database 132 (other generative models, such as those trained on audio data, are also contemplated). Although particular engines and/or sub-engines are depicted as having access to particular databases, it should be understood that is for the sake of example and is not meant to be limiting. For instance, in some implementations, each of the various engines and/or sub-engines of the GM based output system 120 may have access to each of the various databases. Further, some of these databases can be combined and/or omitted in various implementations. Accordingly, it should be understood that the various databases interfacing with the GM based output system 120 illustrated in FIG. 1 are depicted for the sake of describing certain data that is accessible to the GM based output system 120 and is not meant to be limiting.

In various implementations, the GM engine 124 may be configured to process, using a GM stored in the GM(s) database 126, GM based input to generate a stream of GM output. In some implementations, this stream of GM output may be provided to one or more remote computing devices, such as the edge device 110, by GM based output engine 134. The GM(s) contained in GM database 126 can be any generative model capable of generating generative vision data, generative audio data, generative textual data, and/or other forms of generative data. Some non-limiting examples of generative models that are capable of generating one or more forms of the generative data noted above include transformer-based machine learning models (e.g., encoder-decoder transformer models, encoder-only transformer models, decoder-only transformer models, etc. that optionally employ an attention mechanism or some other form of memory), stable diffusion-based machine learning models, recurrent neural network-based machine learning models, etc. Various generative models may be multimodal in that they are capable of processing inputs in various modalities (e.g., text-based inputs, vision-based inputs, audio-based inputs, etc.) and generating outputs in various modalities (e.g., text-based output, vision-based outputs, audio-based generative outputs, etc.). Some particular non-limiting examples of these multimodal generative models include the Gemini family of models, the ChatGPT family of models, the Claude family of models, the Llama family of models, and/or other families of sequence-to-sequence generative models.

The VLM engine 130 may be configured to process, using a VLM stored in the VLM(s) database 132, one or more modalities of input, including visual input (e.g., digital images), to generate a stream of VLM output. The VLM can include, for example, any VLM that is stored in the VLM(s) database 132, such as pathways language and image model (PaLI), ALIGN, Gemini, VisualBERT, VilBERT, ImageBERT, Pixel-BERT, UNITER, BLIP, OSCAR, VILT, LXMERT, CLIP, Florence, and/or any other VLM, such as any other VLM that is encoder-only based, decoder-only based, sequence-to-sequence based and that optionally includes an attention mechanism or other memory, fusion encoder-based, dual encoder-based, and/or a combination of both.

Figure 2:
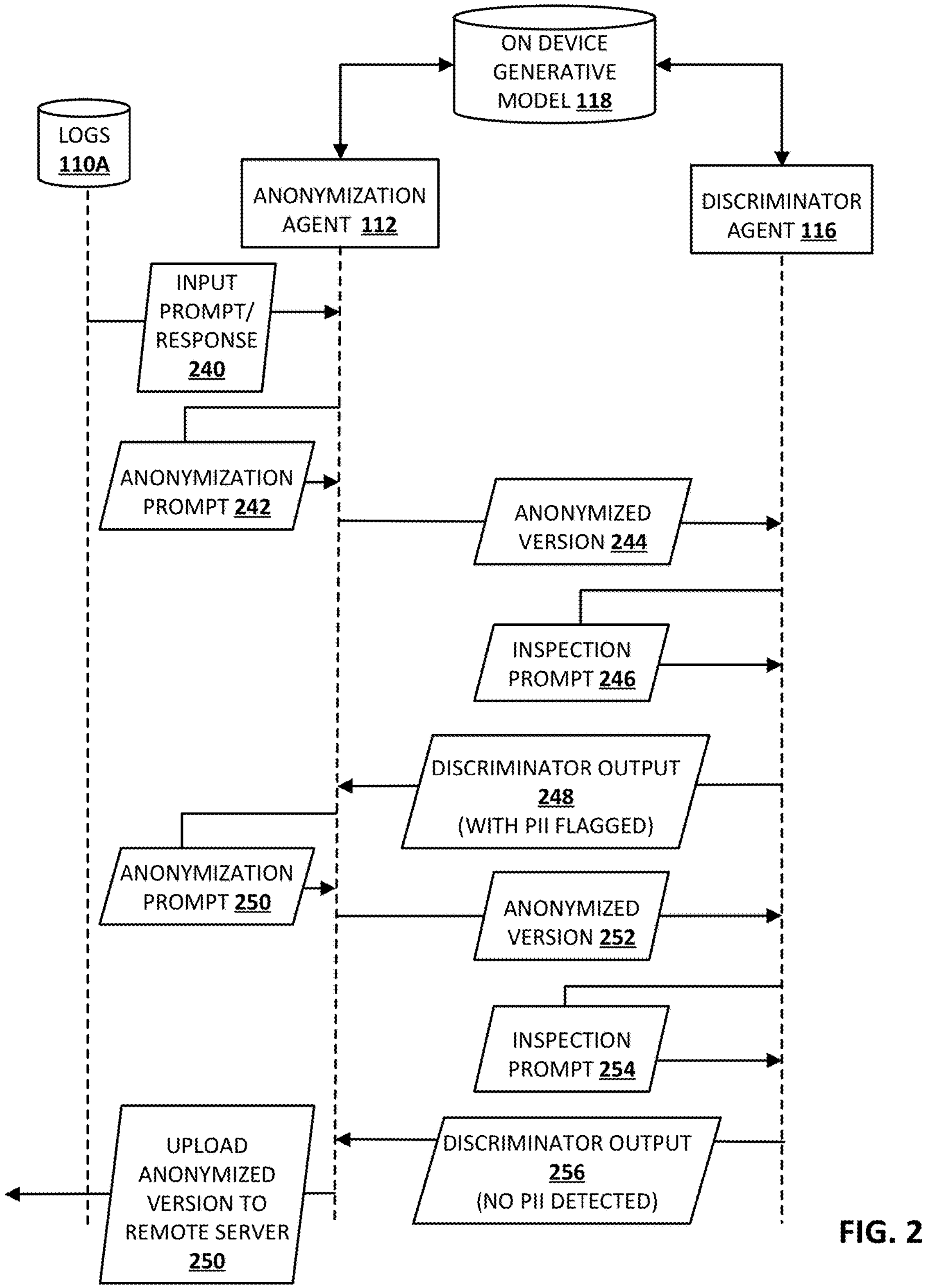
FIG. 2 schematically depicts an example of how various components may exchange data to facilitate multi-modal assistant engagement, in accordance with various implementations.

FIG. 2 schematically depicts an example of the way in which on-device generative model 118, anonymization agent 112 and discriminator agent 116 may be used together to facilitate an edge-based anonymization process, in accordance with various implementations. In FIG. 2, time runs down the page. Starting at top left, data indicative of an input prompt and/or response 240 (explicitly received or implied) may be provided to anonymization agent 112. In some cases, this input prompt and/or response may contain sensitive information and/or PII, such as credit card number(s), telephone number(s), social security number(s), address(es), user credentials, and so forth.

In various implementations, at least a portion of the generative model input prompt and/or response 240 may be assembled into an “anonymization prompt” 242, e.g., along with a command to anonymize the portion of the generative model input prompt. This anonymization prompt 242 may include an explicit natural language query issued by the user, as well as other data that was incorporated into the generative model input prompt explicitly by the user and/or automatically (e.g., based on the user query, the context, etc.). For example, with the user’s permission, various metadata indicative of attributes, preferences, and/or context of a user and/or edge device 110 of FIG. 1, operated by the user may have been incorporated into the generative model input prompt previously. This metadata may include, for instance, position coordinates of the user, a time of day, various sensor data generated by sensor(s) of the edge device, data from the user's electronic calendar or schedule, information from the user's electronic correspondence (e.g., emails, text messages, social media posts or direct messages, etc.), user preferences, payment information, configuration data related to Internet of Things (IoT) devices and appliances under the user's control, personal information, and so forth. While many of these data points may be highly sensitive and/or PII, users often choose to include them in generative model input prompts nonetheless to obtain results/responses that are more useful and/or tailored towards the user. Accordingly, techniques described herein may allow users to more safely include such data in generative model input prompts without fear that this data will be surfaced off device, e.g., to train generative models.

Various commands to anonymize data may be incorporated into anonymization prompt 242 as well. These commands may condition on-device generative model 118 to process the data contained in anonymization prompt 242 in various ways. These commands, which may be used alone and/or in combination, may take various forms, such as natural language commands, predefined flags/signals, heuristics to select particular commands based on context, etc. In some implementations, the command to anonymize data may be a command to replace PII in the data with synthetic PII. For example, a real user's name and address may be replaced with a synthetized name (e.g., "John Doe") and a synthesized address, neither of which may exist in the real world.

In other implementations, the command to anonymize data may be a command to replace instances of PII in generative model input prompt and/or response 240 with placeholders and/or hashed values. In various implementations, these place holders may be uniform or may identify a class of an entity (e.g., "<PERSON>", "<PLACE>", "<THING>") that was replaced. In yet other implementations, the command to anonymize data may be a command to generate a summary of the PII-laden data that omits PII. For instance, if Delia requests that a doctor's appointment be scheduled with Dr. Mavis at 1 PM on January 8, the resulting summary may be, for instance, "The user requested a doctor's appointment one afternoon in January." In yet other implementations, a separate agent may be deployed to leverage on-device generative model(s) 118 to generate natural language commands that account for context of the user and/or edge device 110, as well as to generate the anonymization prompt.

Anonymization agent 112 may process input prompt and/or response 240 using an on-device generative model 118 to anonymize the sensitive information and/or PII from input prompt and/or response 240. In various implementations, anonymization prompt 242 may be processed, e.g., by anonymization agent 112 using one or more on-device generative models 118, to generate/predict anonymized version(s) 244 of whatever data was assembled into the anonymization prompt. Anonymized version(s) 244 may be generated/predicted in a manner that is commensurate with the anonymization command that was included in anonymization prompt 242. For example, if the command was to replace PII with synthetic PII, then PII such as a user's name, or another entity's name contained in the user query, may be replaced with a synthetic name that is generated by the generative model. In another example, when the user requests to make a hotel reservation for an upcoming trip by providing credit card details, PII in the anonymized version, such as name, place, and credit card details, could be replaced with synthetic/anonymized name, place, and credit card details, respectively.

In various implementations, anonymized version 244 may be assembled into an inspection prompt 246. The inspection prompt 246 may then be processed, e.g., by discriminator agent 116 using one or more on-device generative models 118, to determine whether any remaining PII or other sensitive information remains. In some implementations, the discriminator machine learning model used by discriminator agent 116 may be trained in tandem with the on-device generative model 118 (used by anonymization agent 112), e.g., in an adversarial fashion. In this scenario, the generator machine learning model may be trained to strip anonymization prompt 242 of PII, and the discriminator machine learning model may be trained to detect whether inspection prompt 246 includes PII. On this inspection, discriminator agent 116 may generate discriminator output 248 with detected PIIs flagged. As shown in FIG. 2, discriminator agent 116 may pass the discriminator output 248 back to anonymization agent 112.

Assuming the discriminator output 248 includes flagged PII, the anonymization agent 112 may assemble a new (or "next") anonymization prompt 250. The anonymization agent 112 may then process the new anonymization prompt 250 using on-device generative model(s) 118 to strip the new anonymization prompt 250 of PII. Anonymization agent 112 may then provide a new (or "next") anonymized version 252 of the new anonymization prompt 250 to discriminator agent 116. In various implementations, the new anonymized version 252 may once again be assembled into a new (or "next") inspection prompt 254.

The new inspection prompt 254 may then be processed by discriminator agent 116 using on-device generative model(s) 118 to determine whether PII or other sensitive information remains. This process may continue iterating in this fashion until no PIIs are found by discriminator agent 116. For example, in FIG. 2, the discriminator agent 116 generates new discriminator output 256 in which no PII is detected.

In some implementations, such as the scenario depicted in FIG. 2, the discriminator agent 116 may provide the discriminator output 256 indicating no remaining PIIs to the anonymization agent 112. The anonymization agent 112 may determine that no more PII is present. This may enable the anonymization agent 112 to perform various actions, such as storing the PII in memory that is subject to less stringent security concerns, thereby decreasing costs. Additionally or alternatively, the anonymization agent 112 may upload, transmit, or otherwise provide the latest anonymized version (250 in FIG. 2) to downstream processes or entities, such as the GM based output system 120 depicted in FIG. 1. The GM based output system 120 may then use this anonymized data for purposes such as training or fine-tuning generative model(s) 126 and/or VLMs 132. Alternatively, in some implementations, the discriminator agent 116 may determine that no PII was flagged in the latest discriminator output 256, and may not pass this information to the anonymization agent 112 (and instead may provide message such as "approved," no PII detected," etc. If the discriminator output 256 reveals some remaining PII, on the other hand, then the anonymized data may be iteratively resubmitted to the same edge-based anonymization process as many times as necessary until no PII remains, or until some stop condition is met.

Figure 3:
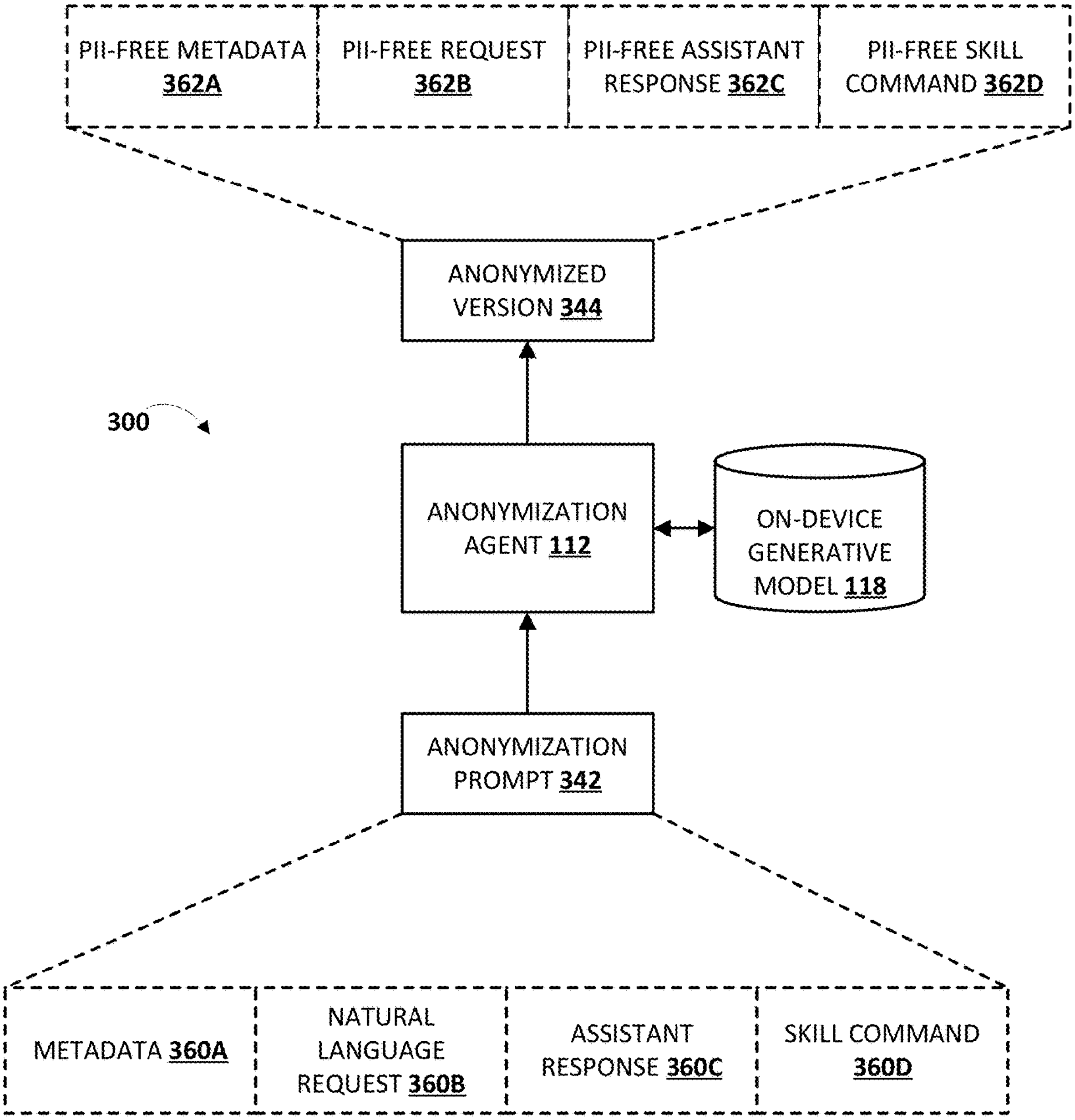
FIG. 3 schematically depicts an example of an anonymization process in which selected aspects of the present disclosure may be implemented.

FIG. 3 schematically depicts an example edge-based anonymization process in which selected aspects of the present disclosure are implemented. The four blocks 360A-D at bottom demonstrate the type of data that may be included in an anonymization prompt 342 to be stripped of PII. These are not intended to be limiting; one or more may be omitted and/or replaced with other types of data.

Metadata 330A is any contextual data that might be pulled (implicitly, the user doesn't have to provide it) to help with fulfilling the request, such as the user's location, time of day, user preferences, user calendar, IoT configuration data, personal data (e.g., credit card information, address, phone number, email address), etc. Natural language request 330B is the natural language request issued by the user to the assistant (e.g., "Create a calendar entry on November 9 at 4 for me to see Dr. Phil"), which may or may not be part of a larger conversation between the user and an automated assistant. Assistant response 330C may include what the assistant provided in response to the natural language request 330B (e.g., "OK, I've created an appointment on your calendar to see Dr. Phil on November 9 at 4"). Skill command 330D may be a command that is sent to a third party service, such as a calendar service, a smart appliance service, a pharmacy delivery service, etc., that causes the user's request to be fulfilled, if not fulfillable directly by the automated assistant.

Anonymization prompt 342 may be assembled by anonymization agent 112 from the data represented by blocks 330A-D. Anonymization agent 112 may then process the anonymization prompt 342 using one or more on-device generative models 118 to generate an anonymized version 344. As indicated by the dashed lines, the anonymized version 344 may include PII-free metadata 320A, PII-free request 320B, PII-free assistant response 320C, and PII-free skill command 320D respectively. This data 320A-D may either be free from PII currently or, if some remaining or residual PII is detected, subjected to the same edge-based anonymization process once again.

Anonymized version(s) 344 may be generated/predicted in a manner that is commensurate with the whichever anonymization commands included in anonymization prompt 342. For example, if the command was to replace PII with synthetic PII, then PII such as a user's name, or another entity's name contained in the user query, may be replaced with a synthetic name that is generated by the generative model. If the command was to replace PII with placeholders/hashed values, then PII may be replaced with generic placeholders or hashed values that may or may not identify a class or data type associated with the data they replace.

Figure 4:
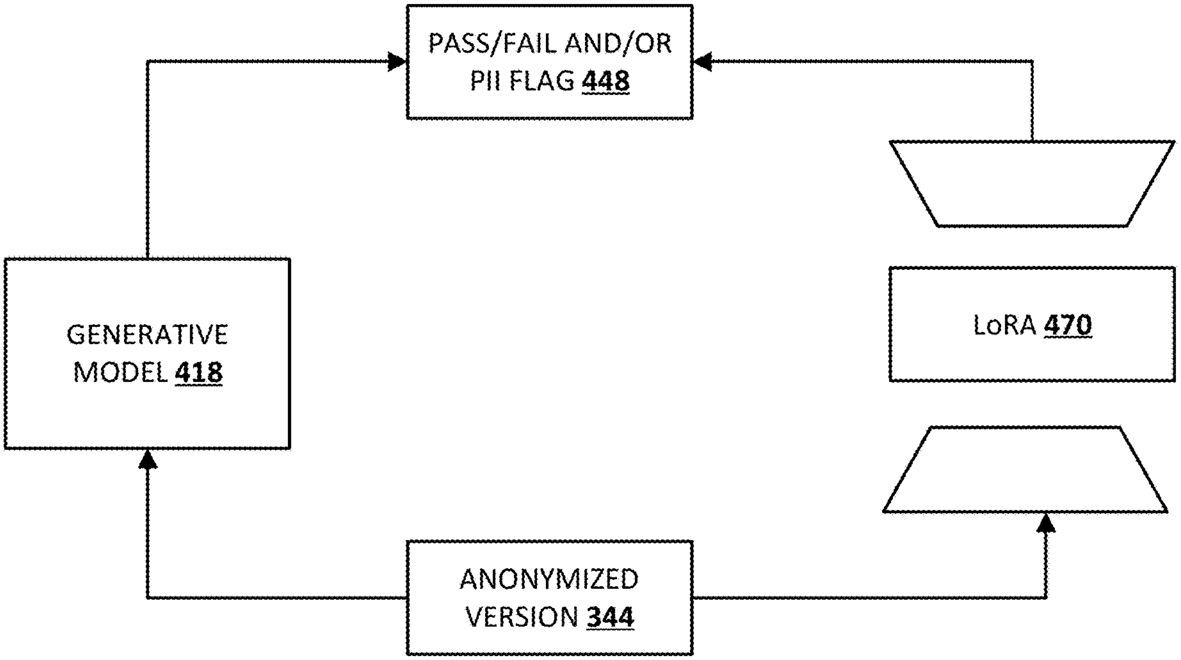
FIG. 4 schematically depicts an example of how various components may exchange data to facilitate a discrimination process.

As noted previously, in some implementations, the same on-device generative model 118 used by the anonymization agent 112 to strip PII from data may also be used by the discriminator agent 116 to inspect purportedly anonymized data for PII. In some (but not all) such implementations, additional layer(s) may be used by the discriminator agent 116 to perform its inspection. One such example is depicted in FIG. 4, which schematically depicts a low-rank adaptor (LoRA) 470 coupled with a larger trained generative model 418. The LoRA 470 may be trained (e.g., while the generative model 118 is held constant) independently, so that the combination of generative model 418 and LoRA 470 may subsequently be used as a discriminator that can detect PII. In some implementations, LoRA 470, may have two downstream weight matrices. One transforms the anonymized version 344 from the original dimension to the low-rank dimension. And the second matrix transforms the low-rank data to the output dimensions of the original model. In some implementations, the discriminator agent 116 may process anonymized version 344 to determine whether anonymized version 344 contains any PII, e.g., by generating output 448 that includes one or more flags and/or a pass/fail indication depending on the absence/presence of PII respectively in anonymized version 344.

During the process of training generative model 410, modifications are made to the LoRA 470 parameters, which may be considerably fewer than parameters of the on-device generative model 418. Consequently, the LoRA parameters 470 can be trained much faster and at a fraction of the cost of doing full fine-tuning. For example, generative model 418 may be used with multiple applications having different purposes. Instead of creating a separate fine-tuned version of generative model 418 for each application, LoRA 470 can be used to create a set of downstream/parallel weights for each application. At inference time, the base model is loaded and the LoRA weights of each application to make the final compute.

Accordingly, in some implementations, multiple LoRAs (or more generally, adaptors) may be trained and deployed to adapt generative model 418 to different skills. For example, one adaptor (e.g., LoRA) may be trained in a specific domain, such as banking. Another may be trained for the medical industry. Another may be trained for the insurance industry. And so on. However, it is not required to use separate adaptors for each application. In some implementations, instead of using adaptors such as LoRAs, one or more on-device generative models may be fine-tuned for similar features, domain, and/or applications, e.g., with one on-device generative model trained for banking, another for the medical industry, another for the insurance industry, and so forth.

Figure 5:
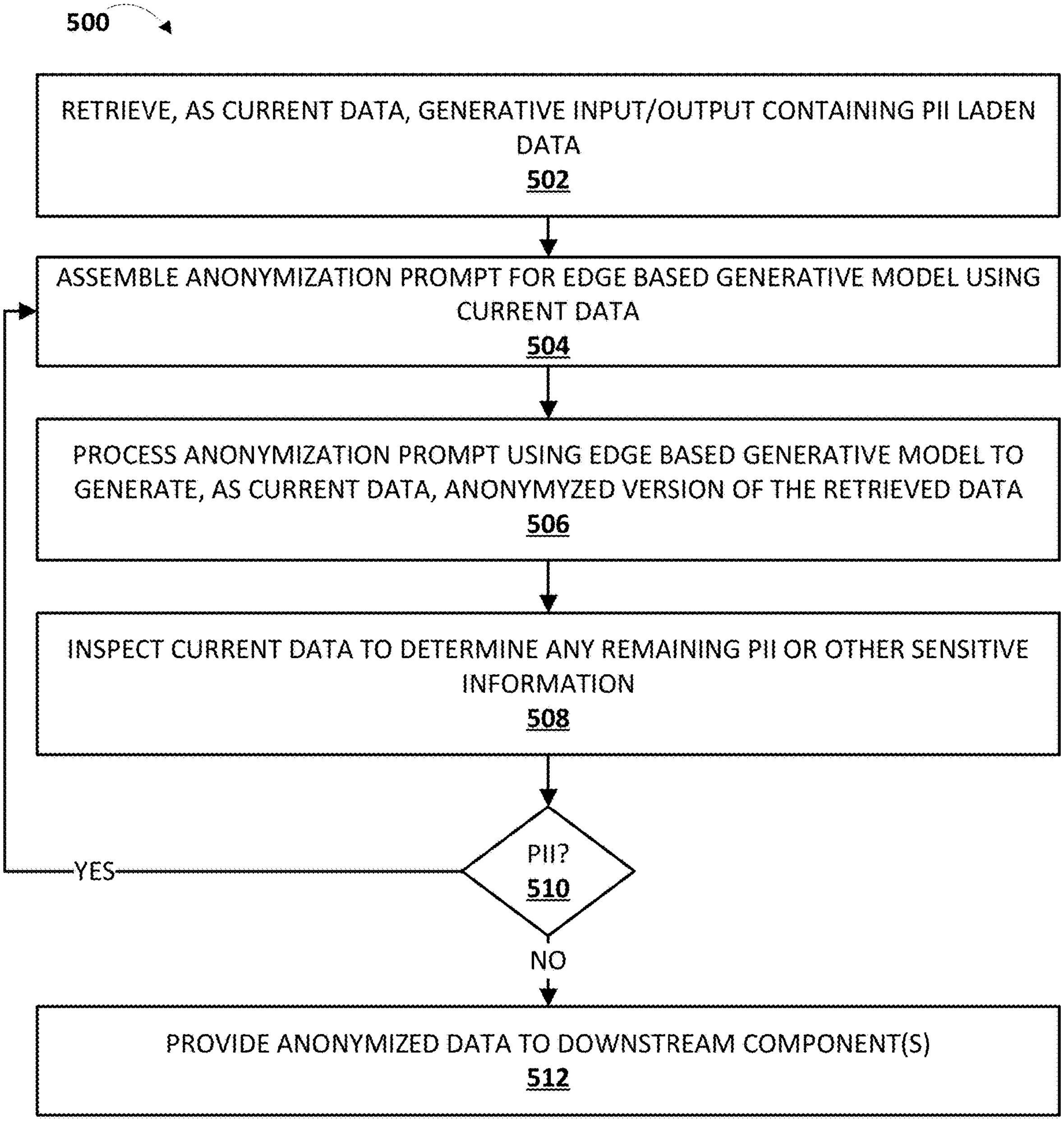
FIG. 5 depicts a flowchart illustrating an example method of practicing selected aspects of the present disclosure, in accordance with various implementations.

FIG. 5 depicts a flowchart illustrating an example method of practicing selected aspects of the present disclosure, in accordance with various implementations. For convenience, the operations of method 500 are described with reference to a system that performs the operations. This system may include one or more processors, memory, and/or other component(s) of computing device(s). Moreover, while operations of the method 500 are shown in a particular order, this is not meant to be limiting. One or more operations may be reordered, omitted, and/or added.

At block 502, the system retrieves, as what will be referred to herein as "current data" for convenience, generative input and/or output containing PII laden data from logs 110A of FIG. 1. For example, a user may have previously requested the assistant to "book tickets for the music concert of Hypothetical Musician for Sep. 20, 2024, Friday, with the VISA card 1234-5678-0000-9876" (in other implementations, the credit card information may be provided automatically as metadata). At that time, this prompt may have been stored in log 110A. Subsequently, the prompt may be retrieved by the system at block 502 as current data. In other implementations, such a user request may be processed using techniques described herein immediately as/after the request is received and submitted to the automated assistant, and prior to storing the user request in the automated assistant log, to avoid storing PII in the log in the first place. In some implementations, the logs may be processed, e.g., based on one or more heuristics (e.g., pattern matching for credit card numbers, addresses, entity recognition for names, etc), to filter out log entries that lack PII and/or prioritize log entries that do include PII. This may enable computational resources to be used more efficiently to process those log entries containing PII, without expending resources on log entries that lack PII and therefore pose less risk.

Thereafter, at block 504, the system assembles anonymization prompt (e.g., 242, 250 in FIG. 2)) for an edge based generative model 118 using the current data (e.g., the user's prior prompt about booking tickets for the concert). The system, e.g., by way of anonymization agent 112, may process anonymization prompt at block 506 using an edge based generative model 118 to generate, as a new version of "current data," an anonymized version of the retrieved data. For example, the anonymization prompt may be processed to generate a new iteration of "current data" in which the PII is removed from the anonymization prompt. The anonymization version of the retrieved data may become, for instance, "book tickets for a concert happening in September with the VISA card **---**". In some implementations, the current data may be stored in the log, e.g., instead of the user's original query.

At block 508, the system, e.g., by way of discriminator agent 116, inspects current data to determine any remaining PII or other sensitive information in the anonymized version of the data. At block 510, it may be determined, e.g., by discriminator agent 116 and/or anonymization agent 112, whether any PII is found in the anonymized version of the data. If the answer at block 510 is yes, then method 500 may proceed back to block 504, at which point a new iteration of the edge-based anonymization process may occur. If the answer at block 510 is no, however, then method 500 may proceed to block 512, at which point the system provides the anonymized data to downstream component(s). As one non-limiting example, the anonymized may be provided to GM based output system 120 for training/finetuning models 126/132). As another non-limiting example, the anonymized data may be more safely stored, e.g., locally on edge device 110 as a log entry.

Figure 6:
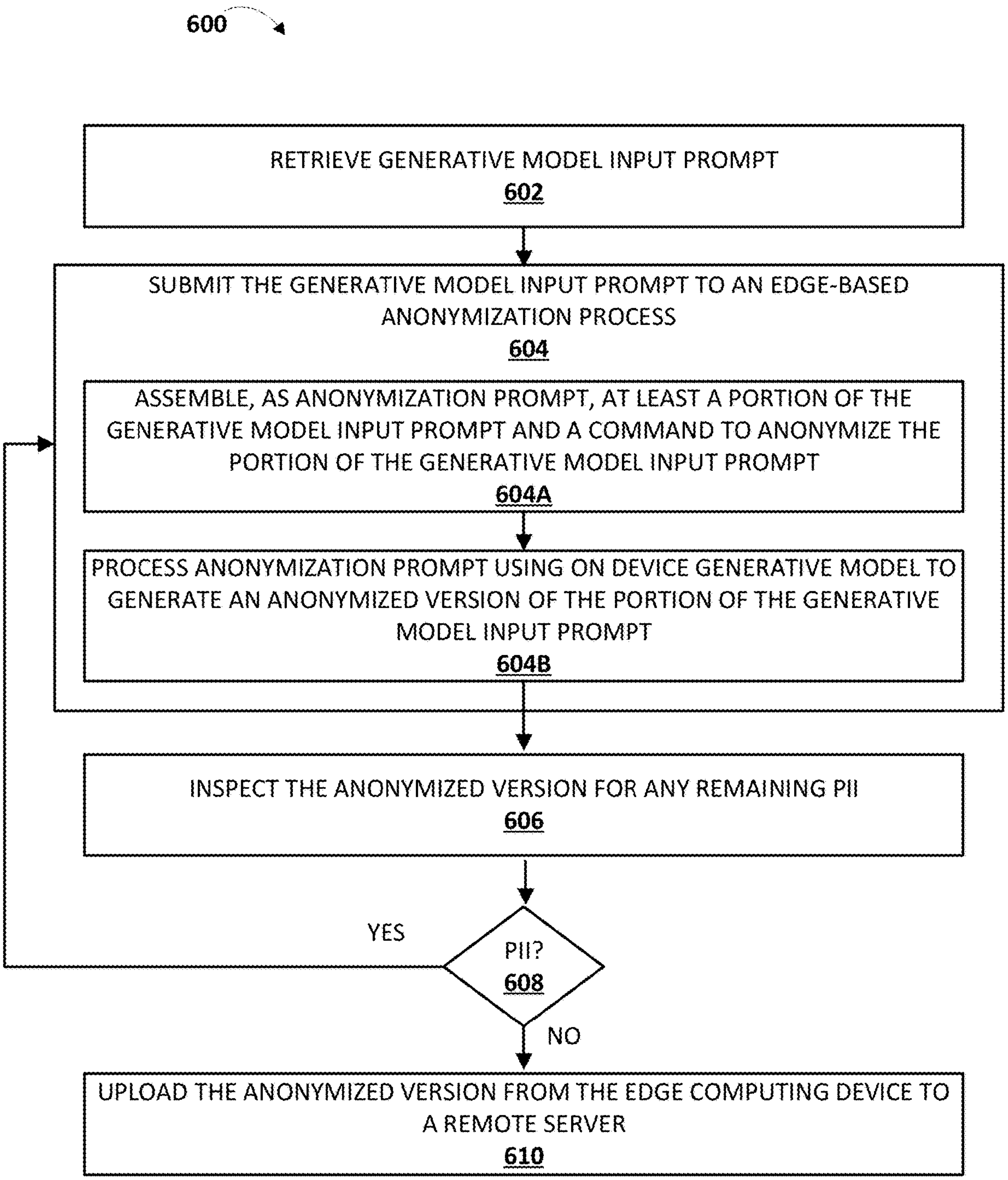
FIG. 6 depicts a flowchart illustrating another example method of practicing selected aspects of the present disclosure, in accordance with various implementations.

FIG. 6 depicts a flowchart illustrating another example method of practicing selected aspects of the present disclosure, in accordance with various implementations. For convenience, the operations of the method 600 are described with reference to a system that performs the operations. This system may include one or more processors, memory, and/or other component(s) of computing device(s). Moreover, while operations of the method 600 are shown in a particular order, this is not meant to be limiting. One or more operations may be reordered, omitted, and/or added.

At block 602, the system retrieves generative model input prompt. At block 604, the system submits the generative model input prompt to an edge-based anonymization process, which may include blocks 604A-B. At block 604A, the system assembles, as an anonymization prompt, at least a portion of the generative model input prompt and a command to anonymize the portion of the generative model input prompt. The portion of the generative model input prompt is not limited to a natural language request issued by the user. For example, various metadata indicative of attributes, preferences, and/or context of a user and/or an edge device operated by the user may have been incorporated into the generative model input prompt with the user's natural language command; all, some, or none of this data may be incorporated into the anonymization prompt. This metadata may include, for instance, position coordinates of the user, a time of day, various sensor data generated by sensor(s) of the edge device, data from the user's electronic calendar or schedule, information from the user's electronic correspondence (e.g., emails, text messages, social media posts or direct messages, etc.), user preferences, payment information, IoT configuration data, personal information, and so forth. Many of these data points may be highly sensitive and/or PII, such as credit card number(s), telephone number(s), social security number(s), address(es), user credentials, and so forth.

At block 604B, the system, e.g., by way of anonymization agent 112, may process the anonymization prompt using on-device generative model to generate an anonymized version of the portion of the generative model input prompt that was included in the anonymization prompt (in some implementations, the entire generative model input prompt may have been incorporated into the anonymization prompt). The anonymized version of the portion of the generative model input prompt may be generated/predicted in a manner that is commensurate with the anonymization command that was included in the anonymization prompt. For example, if the command was to replace PII with synthetic PII, then PII such as a user's name, or another entity's name contained in the user query, may be replaced with a synthetic name that is generated by the generative model.

In some implementations, the anonymization prompt may include, in addition to or instead of the PII-laden data to be anonymized, a request of how to anonymize the PII-laden data. For example, the anonymization prompt may include a request such as "I need to scrape a text message of PII. Please provide a sequence of steps I should take." When this anonymization prompt is processed by anonymization agent 112 using one or more generative models 118, the output may include steps that can be taken to anonymize the text message, such as to perform regular expression matching for names/numbers, then rewrite those instances with synthetic data, hash values, placeholders, etc. These steps can then be used, for instance, as part of a subsequent anonymization prompt that is processed by anonymization agent 112 using generative model(s) 118 to generate a new response where the steps have been performed based on the generative model(s) themselves. Additionally or alternatively, to the extent the steps are performable by edge computing device 110 directly, e.g., without using machine learning, edge computing device 110 may perform those steps. For example, code or instructions could be generated by anonymization agent 112 that can then be executed to anonymize the PII-laden data.

If the anonymization prompt also includes the PII-laden data, then the PII-laden data may condition the generative model(s) to generate steps that are tailored towards anonymizing the PII-laden data specifically. For example, if the PII-laden data includes an image, then the steps may include "perform OCR to detect any text, analyze any OCR'd text for PII, . . . " If the PII-laden includes audio data (e.g., recorded digital audio, waveform, etc.), then the steps may include "identify phonemes, create sentences based on identified phonemes, . . . "

In some implementations, anonymization agent 112 may query a cloud-based generative model (e.g., 126, 132) for steps to perform to anonymize PII-laden data, e.g., without providing the PII-laden data to the cloud itself. For example, anonymization agent 112 may assemble a prompt that includes a request for steps to take to anonymize a particular type of data (e.g., images, audio, text, etc.), and may even include metadata about the PII-laden data such as size, bitrate, resolution, whether OCR has already been performed, an underlying format (e.g., PostScript used to generate PDF files), etc. The cloud-based generative model may provide the steps to perform, which edge computing device 110 may then perform to anonymize PII-laden daa locally, so that the PII is not surfaced to unauthorized entities.

Referring back to FIG. 6, method 600 next proceeds to block 606. At block 606, the anonymized version is inspected, e.g., by discriminator agent 116, for any remaining PII. If any remaining PII is found at block 608, method 600 may proceed back to block 604, at which point the anonymized version is resubmitted to the edge-based anonymization process. However, if the answer at block 608 is no, then at block 610, the system uploads the anonymized version from the edge computing device to a remote server for training generative models. As noted elsewhere herein, block 610 depicts just one non-limiting example of what the PII-free data may be used for. PII-free data generated using techniques described herein may provide other benefits as well, such as being storable in less secure environments, being sharable between different applications on the same edge device, etc.

In various implementations, the edge-based anonymization process represented by blocks 604-608 described above may be performed entirely at the edge, e.g., on edge device 110 of FIG. 1 and/or across one or more devices forming part of a coordinated ecosystem of devices associated with the user that controls edge device 110. For example, the generative model(s) 118 of FIG. 2, used by anonymization agent 112 to process anonymization prompt 242 of FIG. 2 to generate anonymized version(s) 244, as well as the generative model(s) used by discriminator agent 116 of FIG. 2, may be "on-device" or "edge-based" models that are stored locally in memory of one or more edge-based computing devices. However, in other implementations, the anonymization process could be performed at one or more central servers, assuming the original PII-laden data that is used to generate the anonymized data is neither retained by those servers nor made available outside of those servers.

Techniques described herein are not limited to textual data. In various implementations, other modalities of data, such as images, videos, audio files, multimedia files, etc., may be processed as described herein to generate anonymized content that is safe to use for purposes such as training generative models. For instance, in some cases, generative model input prompt may include non-textual data such as image(s). As an example, a user could provide a digital image of a highly sensitive document, such as a tax return, and a query such as "what does my tax liability look to be?" When assembled into a generative model input prompt and processed using a multimodal generative model such as a vision language model (VLM), the resulting output may be something like "you owe $23,890 in taxes." Training a generative model using this generative model input-output pair would create a substantial risk that the user's highly sensitive information/PII could be exposed by the generative model subsequently.

Accordingly, in various implementations, a multimodal generative model such as a VLM and/or diffusion model may be used to anonymize one or both of the generative model input prompt and the resulting output. For example, an on-device VLM and/or diffusion model may be used to process the image of the tax return and replace PII with synthetic data, placeholders, and/or hashed values. Additionally or alternatively, the VLM may be used to query the image for textual content, and then this textual content may be assembled into an anonymization prompt and processed as described above to generate an anonymized version of the textual content that is safe to use for any number of downstream purposes. These downstream purposes may include, but are not limited to, being used as training data, without exposing the user's PII to the generative model that is being trained or fine-tuned, to comply with less stringent storage and/or data sharing requirements or regulations, etc.

Figure 7:
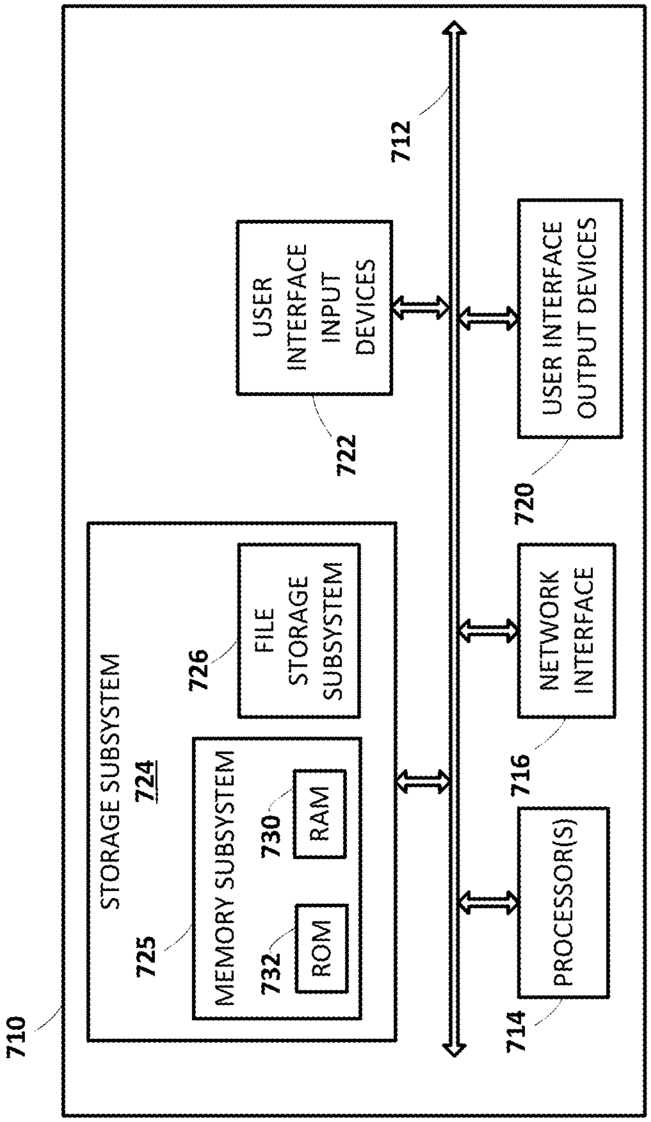
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s) or other cloud-based software application component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1-4.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In various implementations, a method for edge-based anonymization of generative model output may involve retrieving a previously processed generative model input prompt. The prompt may then be submitted to an edge-based anonymization process that assembles a portion of the prompt and processes it using on-device generative model(s) to generate an anonymized version. This anonymized version may be inspected for remaining personally identifiable information (PII). If no PII is found, the anonymized version may be uploaded to a remote server. If PII is found, the anonymization process may be repeated.

The method may further include resubmitting the anonymized version to the anonymization process if PII is found. The portion of the prompt may be a natural language query issued by a user, or it may include metadata incorporated into the prompt along with a natural language query. The metadata may include PII of the user. The anonymized version may be inspected using a discriminator machine learning model, which may be the same on-device generative model finetuned for PII detection or augmented with low-rank adaptors. The on-device generative model may be a large language model, a vision language model, an image generation model, or a diffusion model. It may also be one of the generative models used to process the original prompt. The anonymization prompt may include a command to replace PII with synthetic PII, placeholders, or hashed values, or to generate a summary without PII. The anonymization process may further include assembling a portion of the generative model output into the anonymization prompt.

Other implementations may include a transitory or non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors of an edge computing device, the method comprising:

retrieving, from local memory of the edge computing device, a generative model input prompt that was processed using one or more generative models to generate generative model output;

submitting the generative model input prompt to an edge-based anonymization process that includes:

assembling, as an anonymization prompt, at least a portion of the generative model input prompt, wherein the portion comprises one or more images;

processing the anonymization prompt using one or more on-device generative models of the edge computing device to generate an anonymized version of the portion of the generative model input prompt that is stripped of at least some personally identifiable information (PII), wherein at least one of the one or more on-device generative models comprises a vision language model (VLM) or an image generation model;

inspecting the anonymized version for any remaining PII; and in response to a determination, based on the inspecting, that the anonymized version is free of any remaining PII, uploading the anonymized version from the edge computing device to a remote server.

2. The method of claim 1, further comprising, in response to a determination, based on the inspecting, that the anonymized version includes at least some PII, resubmitting the anonymized version to the edge-based anonymization process.

3. The method of claim 1, wherein the portion comprises a natural language query issued by a user.

4. The method of claim 1, wherein the portion comprises metadata incorporated into the generative model input prompt in conjunction with a natural language query issued by a user.

5. The method of claim 4, wherein the metadata comprises PII of the user.

6. The method of claim 1, wherein the anonymized version is inspected using a discriminator machine learning model.

7. The method of claim 6, wherein the discriminator machine learning model comprises one of the same on-device generative models, and is finetuned for detection of PII.

8. The method of claim 6, wherein the discriminator machine learning model comprises one of the same on-device generative models augmented with one or more low-rank adaptors (LoRAs).

9. The method of claim 1, wherein at least one of the one or more on-device generative models comprises a large language model (LLM).

10. The method of claim 1, wherein the image generation model comprises a diffusion model.

11. The method of claim 1, wherein one or more of the generative models that were used to process the generative model input prompt comprise at least one of the one or more on-device generative models.

12. The method of claim 1, wherein the anonymization prompt is assembled to include a command to anonymize the portion of the generative model input prompt, wherein the command to anonymize the portion of the generative model input prompt comprises a command to replace PII in the portion of the generative model input prompt with synthetic PII.

13. The method of claim 1, wherein the anonymization prompt is assembled to include a command to anonymize the portion of the generative model input prompt, wherein the command to anonymize the portion of the generative model input prompt comprises a command to replace instances of PII in the portion of the generative model input prompt with placeholders or hashed values.

14. The method of claim 1, wherein the anonymization prompt is assembled to include a command to anonymize the portion of the generative model input prompt, wherein the command to anonymize the portion of the generative model input prompt comprises a command to generate a summary of the portion of the generative model input prompt without PII.

15. The method of claim 1, wherein the edge-based anonymization process further includes assembling, into the anonymization prompt, at least a portion of the generative model output.

16. An edge-based system comprising one or more processors and memory storing instructions that, in response to execution by the one or more processors, cause the one or more processors to:

retrieve, from local memory of an edge computing device, a generative model input prompt that was processed using one or more generative models to generate generative model output;

submit the generative model input prompt to an edge-based anonymization process that includes:

assemble, as an anonymization prompt, at least a portion of the generative model input prompt, wherein the portion comprises one or more images;

process the anonymization prompt using one or more on-device generative models of the edge computing device to generate an anonymized version of the portion of the generative model input prompt that is stripped of at least some personally identifiable information (PII), wherein at least one of the one or more on-device generative model comprises a vision language model (VLM) or an image generation model;

inspect the anonymized version for any remaining PII; and in response to a determination, based on the inspecting, that the anonymized version is free of any remaining PII, upload the anonymized version from the edge computing device to a remote server.

17. At least one non-transitory computer-readable medium comprising instructions that, when executed by one or more processors, cause the one or more processors to:

retrieve, from local memory of an edge computing device, a generative model input prompt that was processed using one or more generative models to generate generative model output;

submit the generative model input prompt to an edge-based anonymization process that includes:

assemble, as an anonymization prompt, at least a portion of the generative model input prompt, wherein the portion comprises one or more images;

process the anonymization prompt using one or more on-device generative models of the edge computing device to generate an anonymized version of the portion of the generative model input prompt that is stripped of at least some personally identifiable information (PII), wherein at least one of the on-device generative models comprises a vision language model (VLM) or an image generation model;

inspect the anonymized version for any remaining PII; and in response to a determination, based on the inspecting, that the anonymized version is free of any remaining PII, upload the anonymized version from the edge computing device to a remote server.

* * * * *